(12) United States Patent
Mahgerefteh et al.

(10) Patent No.: US 7,406,266 B2
(45) Date of Patent: *Jul. 29, 2008

(54) FLAT-TOPPED CHIRP INDUCED BY OPTICAL FILTER EDGE

(75) Inventors: Daniel Mahgerefteh, Los Angeles, CA (US); Yasuhiro Matsui, Lawrence, MA (US); Parviz Tayebati, Weston, MA (US); Xueyan Zheng, Culver City, CA (US)

(73) Assignee: Finisar Corporation, Sunnyvale, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/084,630

(22) Filed: Mar. 18, 2005

(65) Prior Publication Data

US 2006/0029396 A1 Feb. 9, 2006

Related U.S. Application Data

(63) Continuation-in-part of application No. 10/289,944, filed on Nov. 6, 2002, now Pat. No. 6,963,685, which is a continuation-in-part of application No. 10/308,522, filed on Dec. 3, 2002, which is a continuation-in-part of application No. 10/680,607, filed on Oct. 6, 2003, now Pat. No. 7,054,538, which is a continuation-in-part of application No. 11/068,032, filed on Feb. 28, 2005.

(60) Provisional application No. 60/554,243, filed on Mar. 18, 2004, provisional application No. 60/566,060, filed on Apr. 28, 2004, provisional application No. 60/569,769, filed on May 10, 2004, provisional application No. 60/569,768, filed on May 10, 2004.

(51) Int. Cl.
*H04B 10/04* (2006.01)

(52) U.S. Cl. ..................... 398/186; 398/201
(58) Field of Classification Search ............... 398/201, 398/185–187
See application file for complete search history.

(56) References Cited

U.S. PATENT DOCUMENTS 4,561,119 A 12/1985 Epworth (Continued)

FOREIGN PATENT DOCUMENTS

GB 2107147 A 4/1983

(Continued)

OTHER PUBLICATIONS

U.S. Appl. No. 11/068,032, filed Feb. 28, 2005, Mahgerefteh et al.

(Continued)

*Primary Examiner*—Leslie Pascal
(74) *Attorney, Agent, or Firm*—Workman Nydegger (57) ABSTRACT

A fiber optic communication system comprising:
an optical signal source adapted to produce a binary amplitude modulated signal; and
an optical spectrum reshaper adapted to receive the amplitude modulated signal and to change the instantaneous frequency of the signal at its 0-to-1 and 1-to-0 transitions so as to change the instantaneous frequency of the signal so that it is substantially constant across the 1 pulse.

A method for transmitting a signal through a fiber, comprising:
generating a second signal from the signal, wherein the second signal comprises a intensity profile and an adiabatic frequency profile;
generating a third signal from the second signal, wherein the third signal comprises a intensity profile and a flat-topped frequency profile.

33 Claims, 7 Drawing Sheets

U.S. PATENT DOCUMENTS

| | | | |
|---|---|---|---|
| 4,805,235 | A | 2/1989 | Henmi |
| 5,371,625 | A | 12/1994 | Wedding et al. |
| 5,416,629 | A | 5/1995 | Huber |
| 5,920,416 | A | 7/1999 | Beylat et al. |
| 5,974,209 | A | 10/1999 | Cho et al. |
| 6,104,851 | A | 8/2000 | Mahgerefteh |
| 6,115,403 | A | 9/2000 | Brenner et al. |
| 6,298,186 | B1 | 10/2001 | He |
| 6,331,991 | B1 * | 12/2001 | Mahgerefteh ............... 372/33 |
| 6,563,623 | B1 | 5/2003 | Penninckx et al. |
| 6,963,685 | B2 | 11/2005 | Mahgerefteh et al. |
| 2004/0008933 | A1 | 1/2004 | Mahgerefteh et al. |
| 2004/0008937 | A1 | 1/2004 | Mahgerefteh et al. |
| 2004/0096221 | A1 | 5/2004 | Mahgerefteh et al. |
| 2004/0218890 | A1 | 11/2004 | Mahgerefteh et al. |

FOREIGN PATENT DOCUMENTS

| | | |
|---|---|---|
| WO | 9905804 | 2/1999 |

OTHER PUBLICATIONS

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Wedding, B., et al., 10-Gb/s Optical Transmission up to 253 km Via Standard Single-Mode Fiber Using the Method of Dispersion-Supported Transmission, Journal of Lightwave Technology, 1994, 1720, vol. 12, No. 10.

Kurtzke C. et al., Impact of Residual Amplitude modulation on the Performance of Dispersion-Supported and Dispersion-Mediated Nonlinearity-Enhanced Transmission, Electronics Letters, Jun. 9, 1994, 988, vol. 30, No. 12.

Rasmussen, C.J. et al., Optimum Amplitude and Frequency-Modulation in an Optical Communication System Based on Dispersion Supported Transmission, Electronics Letters, Apr. 27, 1995, 746, vol. 31, No. 9.

Wedding, B., Analysis of Fibre Transfer Function and Determination of Receiver Frequency Response for Dispersion Supported Transmission, Electronics Letters, Jan. 6, 1994, 58, vol. 30, No. 1.

Yu et al. Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Morton, P.A., et al., "38.5km error free transmission at 10Gbit/s in standard fibre using a low chirp, spectrally filtered, directly modulated 1.55 μm DFB laser", Electronics Letters, Feb. 13, 1997, vol. 33(4).

* cited by examiner

Figure 1. Schematic showing a pulse with adiabatic chirp (left) and one with flat-top chirp (right).

Figure 2. A first order OSR and spectral position of input optical signal

Figure 3. The amplitude and instantaneous frequency of a pure amplitude modulated super-Gaussian before and after a first order OSR.

Figure 4. Simulations and data showing the impact of the blue shifted transition region in rising and falling edge after propagation. Inset shows measured intensity profile after 200 km of fiber having 17 ps/nm/km dispersion.

Figure 5. Pulse shape and instantaneous frequency of an adiabatically chirped Guassian pulse before and after a first order OSR. The Guassian adiabatic chirp is substantially made into a flat-top profile after the OSR.

Figure 6. Amplitude and frequency profile of pulses after an OSR. The single bit has flat-top chirp, while the 1111 bit sequence has rabbit ears.

Figure 7

FLAT-TOPPED CHIRP INDUCED BY OPTICAL FILTER EDGE

REFERENCE TO PENDING PRIOR PATENT APPLICATIONS

This patent application claims benefit of:

(i) pending prior U.S. Provisional Patent Application Ser. No. 60/554,243, filed Mar. 18, 2004 by Daniel Mahgerefteh et al. for FLAT CHIRP INDUCED BY FILTER EDGE;

(ii) pending prior U.S. Provisional Patent Application Ser. No. 60/566,060, filed Apr. 28, 2004 by Daniel Mahgerefteh et al. for METHOD OF TRANSMISSION USING PARTIAL FM AND AM MODULATION;

(iii) pending prior U.S. Provisional Patent Application Ser. No. 60/569,769, filed May 10, 2004 by Daniel Mahgerefteh et al. for FLAT CHIRP INDUCED BY AN OPTICAL FILTER EDGE; and (iv) pending prior U.S. Provisional Patent Application Ser. No. 60/569,768, filed May 10, 2004 by Daniel Mahgerefteh et al. for METHOD OF TRANSMISSION USING PARTIAL FM AND AM MODULATION.

This patent application is a continuation-in-part of:

(i) prior U.S. patent application Ser. No. 10/289,944, filed Nov. 06, 2002 now U.S. Pat No. 6,963,685 by Daniel Mahgerefteh et al. for POWER SOURCE FOR A DISPERSION COMPENSATION FIBER OPTIC SYSTEM;

(ii) pending prior U.S. patent application Ser. No. 10/308,522, filed Dec. 03, 2002 by Daniel Mahgerefteh et al. for HIGH-SPEED TRANSMISSION SYSTEM COMPRISING A COUPLED MULTI-CAVITY OPTICAL DISCRIMINATOR;

(iii) prior U.S. patent application Ser. No. 10/680,607, filed Oct. 06, 2003 now U.S. Pat No. 7,054,538 by Daniel Mahgerefteh et al. for FLAT DISPERSION FREQUENCY DISCRIMINATOR (FDFD); and (iv) pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT.

The eight above-identified patent applications are hereby incorporated herein by reference.

FIELD OF THE INVENTION

This invention relates to signal transmissions in general, and more particularly to the transmission of optical signals.

BACKGROUND OF THE INVENTION

The quality and performance of a digital transmitter is determined by the distance over which the transmitted digital signal can propagate without severe distortions. This is typically characterized as the distance over which a dispersion penalty reaches a level of ~1 dB. A standard 10 Gb/s optical digital transmitter, such as an externally modulated source, can transmit up to a distance of ~50 km in standard single mode fiber at 1550 nm before the dispersion penalty reaches the level of ~1 dB. This distance is typically called the dispersion limit. The dispersion limit is determined by the fundamental assumption that the digital signal is transform-limited, i.e., the signal has no time-varying phase across its bits and the signal has a bit period of 100 ps, or 1/(bit rate) for a 10 Gb/s.

In pending prior U.S. patent application Ser. No. 11/068, 032, filed Feb. 28, 2005 by Daniel Mahgerefteh et al. for OPTICAL SYSTEM COMPRISING AN FM SOURCE AND A SPECTRAL RESHAPING ELEMENT and/or pending prior U.S. Provisional Patent Application Ser. No. 60/566, 060, filed Apr. 28, 2004 by Daniel Mahgerefteh et al. for METHOD OF TRANSMISSION USING PARTIAL FM AND AM MODULATION, which patent applications are hereby incorporated herein by reference, there is disclosed a method for generation of an optical signal with increased dispersion tolerance based on FM modulation of an AM signal. A preferred embodiment of the invention is a novel transmitter comprising a directly modulated laser followed by an optical spectrum reshaper (OSR). This transmitter is sometimes referred to as a Chirp Managed Laser (CML™) by Azna LLC of Wilmington Mass. An important aspect of the CML™ is the generation of an AM signal having a flat-topped instantaneous frequency profile having fast rise times and fall times relative to the intensity profile of the signal.

SUMMARY OF THE INVENTION

Here we disclose an apparatus and method for converting the adiabatically chirped output signal from a directly modulated laser (or other FM source) into a flat-topped instantaneous frequency using an optical spectrum reshaper formed, for example by an edge filter. In this respect, a flat-topped frequency profile is to be distinguished from adiabatic frequency profile; for an optical signal having a flat-topped chirp, the intensity profile is substantially encompassed by the frequency profile, so that nearly all the intensity profile has the same constant frequency. By contrast, for adiabatic chirp, the intensity and frequency have substantially the same temporal profile.

In one form of the invention, there is provided a fiber optic communication system comprising:

an optical signal source adapted to produce a binary amplitude modulated signal; and an optical spectrum-reshaper adapted to receive the amplitude modulated signal and to change the instantaneous frequency of the signal at its 0-to-1 and 1-to-0 transitions so as to change the instantaneous frequency of the signal so that it is substantially constant across the 1 pulse.

In another form of the invention, there is provided a fiber optic communication system comprising:

an optical signal source adapted to produce a binary amplitude modulated signal having a first adiabatic instantaneous frequency profile; and an optical spectrum reshaper adapted to receive the signal and change the first adiabatic instantaneous frequency profile to a second substantially flat-topped instantaneous frequency profile.

In another form of the invention, there is provided a fiber optic communication system comprising:

an optical signal source adapted to receive a base signal and produce an amplitude modulated first signal having a first adiabatic instantaneous frequency profile; and an OSR adapted to convert said first signal to a second signal, wherein said second signal has a substantially flat-topped instantaneous frequency profile.

In another form of the invention, there is provided a fiber optic communication system comprising:

an optical signal source adapted to receive a base signal and produce an amplitude modulated first signal; and an OSR adapted to convert said first signal to an amplitude modulated second signal, wherein the rise and fall times of the second signal are correspondingly faster than the rise and fall times of the first signal.

In another form of the invention, there is provided a fiber optic communication system comprising:

an optical signal source adapted to receive a base signal and produce an amplitude modulated first signal having a first adiabatic instantaneous frequency profile; and an OSR adapted to convert said first signal to an amplitude modulated second signal having a second instantaneous frequency profile, wherein the rise and fall times of the amplitude of second signal are correspondingly faster than the rise and fall times of the amplitude of the first signal.

In another form of the invention, there is provided a method for transmitting a signal through a fiber, comprising:

generating a second signal from the signal, wherein the second signal comprises a intensity profile and an adiabatic frequency profile;

generating a third signal from the second signal, wherein the third signal comprises a intensity profile and a flat-topped frequency profile.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 1:
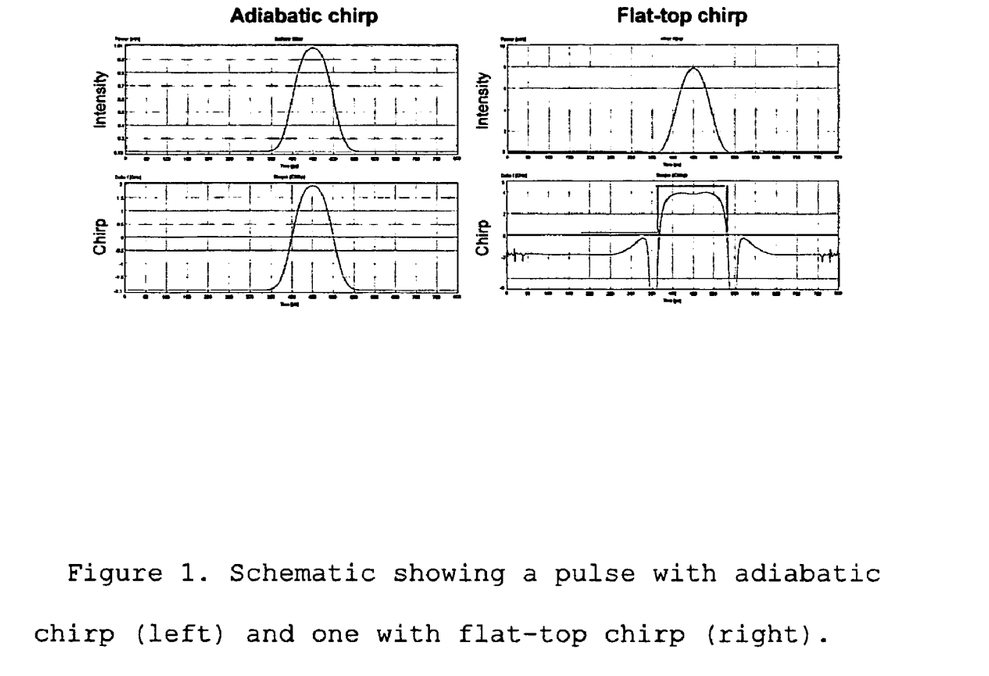
FIG. 1 is a schematic view showing a pulse with adiabatic chirp (left) and a pulse with flat-topped chirp (right)
Figure 7:
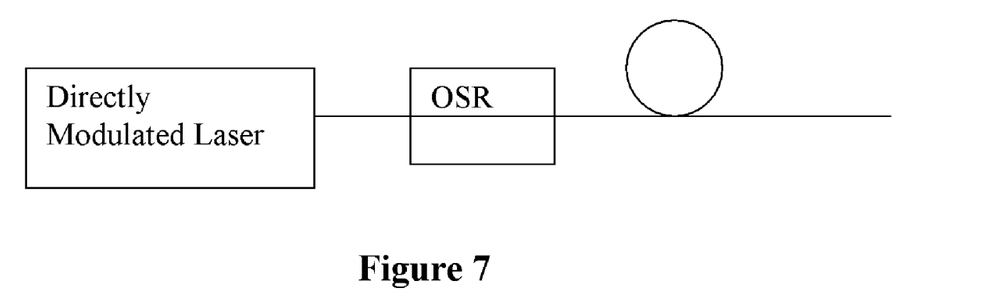
FIG. 7 is a schematic view illustrating a directly modulated laser emitting a signal through an optical spectrum reshaper.

The present invention comprises an apparatus and method for converting the adiabatically chirped output signal from a directly modulated laser (or other FM source) into a flat-topped instantaneous frequency using an optical spectrum reshaper (OSR) formed by an edge filter (see FIG. 7). In this respect, a flat-topped frequency profile is to be distinguished from adiabatic frequency profile; for an optical signal having a flat-topped chirp, the intensity profile is encompassed by the frequency profile, so that nearly all the intensity profile has the same constant frequency. By contrast, for adiabatic chirp, the intensity and frequency have substantially the same temporal profile. This is shown in FIG. 1.

Passing an optical pulse with adiabatic chirp through an optical spectrum reshaper (OSR) can modify the instantaneous frequency to a square shaped flat-topped profile with short rise and fall times. For the purposes of the present invention, the term OSR is intended to mean a passive (or active) optical element that imparts a frequency dependent loss and can change the frequency profile of an amplitude modulated input optical signal. One example of an OSR is a linear edge filter having a linear transmission region, a corner and a constant transmission region, as shown in the example in FIG. 2.

The OSR may also add transient chirp to the signal. Transient chirp is defined as an abrupt change in the frequency from a value $f_1$ to a value $f_1+\delta f$ and back to $f_1$ in a brief time. Transient chirp typically occurs near the 1 bit to 0 bit, or the 0 bit to 1 bit, transitions and has a duration which is much shorter than the bit period. Transient chirp can be positive (defined as a blue shifted excursion of frequency) or negative (defined as a red shifted frequency excursion). Transient chirp may also have a blue shifted component followed by a red shifted component, or vice-versa (a red-shifted component followed by a blue shifted component).

The OSR can be adapted to induce this chirp modification even if the input signal has no FM modulation and is therefore chirp free before the OSR.

In connection with the present invention, the OSR is a filter that is adapted to change the magnitude or shape of the frequency modulation of an amplitude modulated input optical signal; this may be referred to as AM-to-FM conversion.

The OSR can also change the amplitude modulation of a frequency modulated input signal; this may be referred to as FM-to-AM conversion in the art.

The OSR can also be adapted to change the magnitude or shape of the amplitude modulation and the frequency modulation of an input optical signal with both amplitude modulation and frequency modulation; this may be referred to as simultaneous AM-to-FM and FM-to-AM conversion.

The optical signal after a directly modulated laser has adiabatic chirp, and may also have transient chirp. The interaction of adiabatic chirp and transient chirp with the OSR modifies the amplitude of the output by FM-to-AM conversion through the OSR. In order to separate the various effects, we consider two special cases of pure AM input and pure FM input to the OSR, and then we consider the combination.

The transmission spectrum of the OSR can be expanded in a Taylor's series in frequency, having the form:

$$T(\omega)=a_0+a_1\omega+a_2\omega^2+a_3\omega^3+\ldots.$$

The impact of the various terms can be determined separately. An OSR with only the linear term may be referred to as a first order OSR, and so on for higher order terms. The spectral shaping properties of the various terms can then be used to design an OSR for the desired spectral shaping properties. As an illustrative example, a first order OSR will be considered.

Here Fourier Transform theorems are used to calculate the effect of the OSR on an input optical signal. Consider a chirp free (i.e., pure AM) optical electric field $E_B(t)=A(t)\exp(-i\omega_0 t)$ incident on a first order OSR, which has a linear transmission-versus-optical frequency relationship described by:

$$T(\omega)=a+b\omega \text{ for } (a-1)/b<\omega<a/b \quad (1)$$

$$T(\omega)=1 \text{ for } \omega>(1-a)/b$$

$$T(\omega)=0 \text{ for } \omega<-a/b$$

Figure 2:
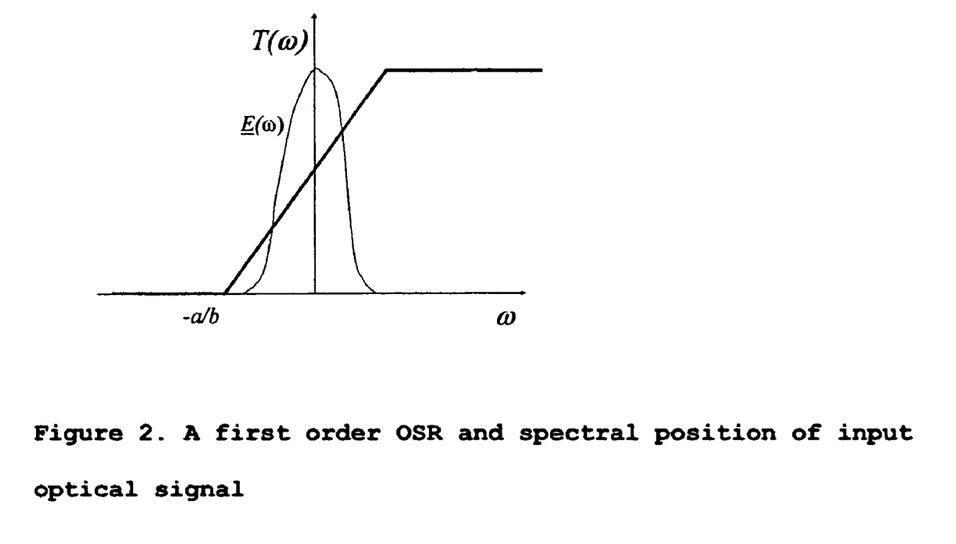
FIG. 2 is a schematic view showing a first order OSR and spectral position of input optical signal.

Here A(t) is the envelope of the field, and ω is the frequency shift from the carrier frequency $\omega_a$. Eq. 1 describes one example of an edge filter. For simplicity, it can be assumed that the entire input signal spectrum is within the linear region of the first order spectrum reshaper, $-a/b < \omega < (1-a)/b$, as shown in FIG. 2. In this case, the time domain impulse response of the OSR is given by the Fourier transform of Eq. (1) to be $$\Im(t) = a\delta(t) + ib\delta'(t) \qquad (2)$$

The impulse response determines the action of the OSR on the input time-varying electric field in the time domain. From Fourier Transform theory, the envelope of the optical field after the OSR is given by the convolution of the edge filter impulse response and the input field, and is given by:

$$E_A(t) = aA(t) + ib\frac{d}{dt}A(t) \qquad (3)$$

Eq. 3 mathematically describes the action of the first order OSR (i.e., the edge filter) on the input electric field. The edge filter adds the time derivative of the input field to itself with a $\pi/2$ phase shift (in complex notation used here, the i in Eq. 3 corresponds to a $\pi/2$ phase shift). Writing this in terms of amplitude and phase, the output field becomes:

$$E_A(t) = \sqrt{a^2 A^2(t) + b^2 A'^2(t)} \exp(\Theta(t)), \qquad (4)$$

where the phase $\Theta$ is given by $$\Theta(t) = \tan^{-1}\left(\frac{bA'(t)}{aA(t)}\right) \qquad (5)$$

The corresponding instantaneous frequency profile is the negative derivative of phase:

$$\delta\omega(t) = -\frac{d\Theta(t)}{dt} \sim -\frac{b}{a}\left[\frac{A''(t)}{A(t)} - \frac{A'^2(t)}{A^2 t)}\right]. \qquad (6)$$

Eq. 4 is, therefore, the envelope of the electric field, and Eq. 6 is its frequency profile at the output of the OSR. In Eq. 4 the second term under the square root is the contribution of the OSR to the amplitude of the field; a higher slope, b, adds more of the derivative. This makes the leading and trailing edges of the pulse to become steep; hence the OSR decreases the rise time and fall time of the amplitude envelope after the OSR. A higher OSR slope leads to a shorter rise time and fall time.

Figure 3:
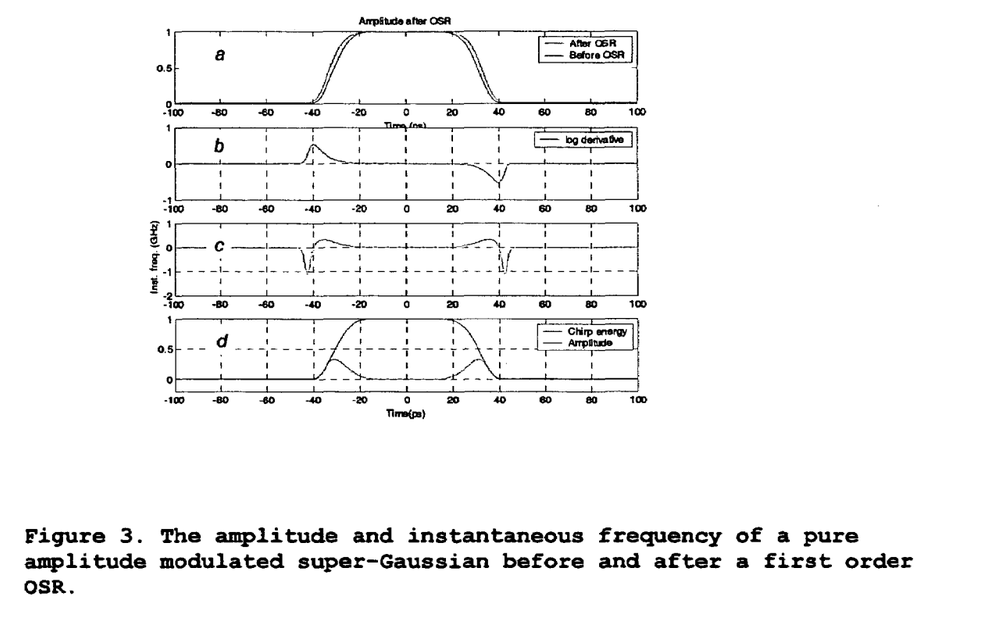
FIG. 3 is a schematic view showing the amplitude and instantaneous frequency of a pure amplitude modulated super-Gaussian signal before and after a first order OSR.

To illustrate the effect of the OSR, FIG. 3 shows the amplitude and instantaneous frequency of a super Gaussian pulse $A(t) = \exp(-t^8/\tau^8)$ before and after a first order OSR. Eqs. 3-6 are used to calculate the output field amplitude and frequency profiles. In this example, the super Gaussian pulse is initially transform limited (i.e., has no chirp) before the OSR and so the instantaneous frequency profile is zero relative to the carrier. After the OSR, FIG. 3a shows that the amplitude of the pulse is enhanced near its rising and falling edges, where the input envelope is changing. This tends to reduce the rise and fall times of the amplitude profile. Hence it is an embodiment of the present invention to reduce the rise times and fall times of an input signal by passing it through an OSR.

This feature can be useful in situations where the bandwidth of the source, such as a DFB laser, is not sufficient for the bit rate of operation, and leads to an eye diagram with a variation in the 1 bit amplitude for single bits compared to longer 1 bit sequences. The use of the OSR with high slope, in this case, can decrease the rise and fall times, and enhance the 1 bit amplitude for single 1s so that they are substantially the same level as the amplitude of the longer sequence of 1 bits. This in turn reduces the bit error rate (BER) at the receiver in the back-back configuration, where the digital signal is directly detected without propagation through a fiber.

More importantly, the OSR may change the instantaneous frequency profile of the output electric field. For the purposes of the present invention, this may be referred to as spectral reshaping. The realization that the OSR may change the instantaneous frequency profile of the output electric field is an important aspect of the present invention. As FIG. 3c shows, the OSR adds some blue-shifted transient frequency modulation to the rising and falling edges of the pulse. The middle portion of the frequency profile of the pulse is unchanged by the OSR in this example. The OSR also induces two sharper, red-shifted transient lobes on either side of the blue-shifted transient chirp, which have smaller energy. The relative energy in the blue and red shifted side lobes can be noticed by weighting the instantaneous frequency profile by the normalized amplitude of the output pulse, as shown in FIG. 3d. The transient chirp induced by the OSR is symmetric for the rising and at the falling edges of the pulse. This is in contrast to the intrinsic transient chirp of DFB laser, for example, in which the transient chirp is blue-shifted for the rising edge and red-shifted for the falling edge. The symmetric blue-shifted transient chirp at the pulse edges, which may be referred to herein as rabbit ears (see FIG. 6), is important for the conversion of adiabatic chirp to flat-topped chirp, as described below.

Figure 4:
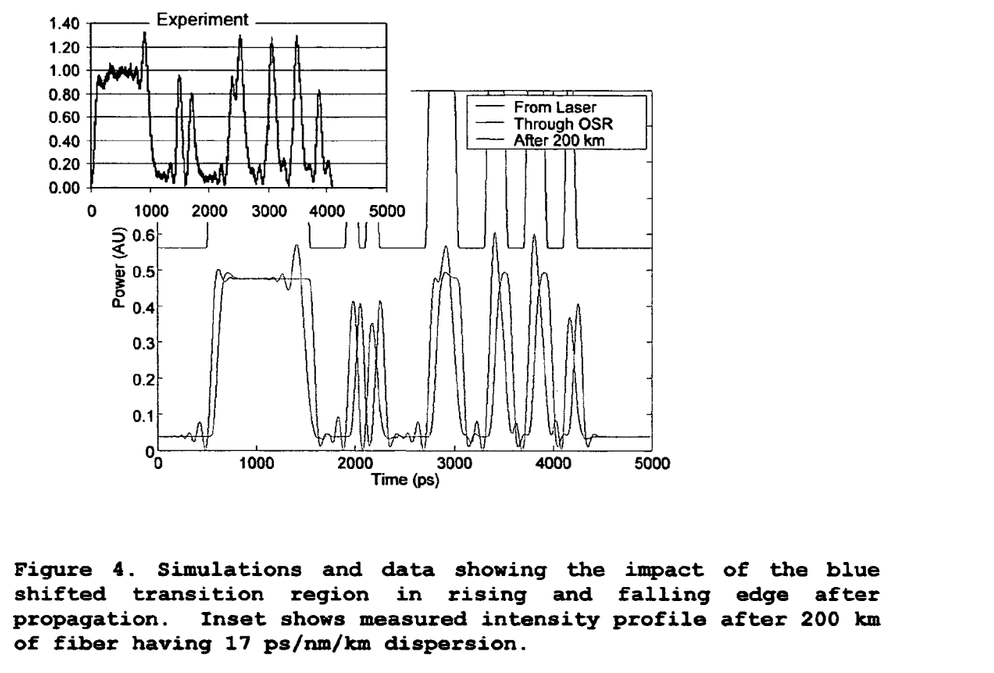
FIG. 4 is a schematic view illustrating simulations and data showing the impact of a blue shifted transition region on rising and falling filter edges after propagation through a fiber; the inset shows the measured intensity profile after 200 km of fiber having 17 ps/nm/km dispersion.

In this example, the blue-shifted transient region on the falling edge of the pulse helps to compress the pulse after propagation though positive dispersion fiber. The blue-shifted transition region on the falling edge, on the other hand, moves into the adjacent 0 bit after propagation through a fiber having positive dispersion and may cause inter-symbol interference. These features are observed in simulations of fiber propagation and experiments as shown in FIG. 4. In the experiment, a directly modulated DFB laser was current modulated to generate adiabatic chirp and 2-3 dB of amplitude modulation. The output was passed through a 2 cavity etalon filter, such that the wavelength of the laser was near the peak slope of the transmission profile of the filter. The high slope of the filter functioned as the OSR, as described above. The inset of FIG. 4 shows the optical signal after propagation though 200 km of standard single mode fiber having 17 ps/nm/km dispersion. The overshoot on the falling edge after propagation is the result of the OSR-induced blue transient chirp. Both simulations and experiment show that the rising edge develops a small ripple, which begins to interfere with the 0 bit to the left. This is also the result of the OSR-induced blue-shifted transient chirp described above. This intra-pulse interference can be controlled by adjusting the adiabatic chirp of the laser, as described by pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT and/or pending prior U.S. Provisional Patent Application Ser. No. 60/569,768, filed May 10, 2004 by Daniel Mahgerefteh et al. for METHOD OF TRANSMISSION USING PARTIAL FM AND AM MODULATION, which patent applications are hereby incorporated herein by reference.

According to Eq. 5 and Eq. 6, the magnitude of the blue-shifted transient component generated by the OSR at the edges of the output pulse is proportional to the slope of the first order OSR, b, and the derivative of the amplitude near the edges. Therefore, faster rise times and fall times in the amplitude profile of the input to the OSR produce larger values of transient chirp after the OSR. The rise time and fall time of the transition in the frequency profile after the OSR are also determined by the rise time and fall times of the amplitude envelope before the OSR.

It is therefore an embodiment of the present invention to adjust the rise time and fall time of the frequency profile after the OSR by adjusting the slope of the OSR. It is another embodiment of the present invention to adjust the transient chirp induced by the OSR by adjusting the slope of the OSR.

It is yet another embodiment of the present invention to adjust the transient chirp induced by the OSR by adjusting the rise time and fall time of the amplitude profile before the OSR.

Spectral Shaping in Presence of Adiabatic Chirp

The OSR may be adapted to convert an input signal with adiabatic chirp to one with flat-topped chirp at the output of the OSR. Basically, starting with a Gaussian shaped amplitude and frequency profile, the symmetric blue-shifted transient chirp induced by the OSR adds to the adiabatic chirp of the input to produce a square shaped frequency profile at the output.

When the input optical field to the OSR has a time varying frequency (i.e., chirp), the input field can be written as $E_B(t) = A(t)\exp(-i\omega_0 t + i\phi(t))$. The output field of the OSR is given by convolution of the OSR impulse response, Eq. 2, with this field. The result is:

$$E_A(t) = \exp(i\phi(t))[A(t)(a + b\Delta\omega(t)) + ibA'(t)], \quad (7)$$

where $$\Delta\omega(t) = -\frac{d\phi(t)}{dt} \quad (8)$$

is the instantaneous frequency shift of the input field from the carrier frequency. The output field after the OSR, from Eq. 7, is $$E_A(t) = \sqrt{A^2(t)(a + b\Delta\omega(t))^2 + b^2 A'^2(t)} \exp(i\phi(t), i\Theta(t)), \quad (9)$$

where the optical phase is modified by the first order OSR to have additional phase $$\Theta(t) = \tan^{-1}\left(\frac{bA'(t)}{A(t)(a + b\Delta\omega(t))}\right), \quad (10)$$

which approaches Eq. 5 in the absence of input chirp, i.e., $\Delta\omega = 0$. The instantaneous frequency profile after the first order OSR is now the sum of the input chirp and the OSR induced portion:

$$\Delta\omega_A(t) = \Delta\omega(t) - \frac{d}{dt}\left[\tan^{-1}\left(\frac{bA'(t)}{A(t)(a + b\Delta\omega(t))}\right)\right]. \quad (11)$$

Considering the case where the argument of the $\tan^{-1}$ is small, Eq. 11 shows that the first order OSR adds the frequency shift associated with the logarithmic time derivative of the envelope to the initial chirp before the OSR. The term in the denominator $b\Delta\omega(t)$ modifies the added chirp somewhat, but as the example below shows, given an input signal with adiabatic chirp, the resultant output of the OSR is a nearly flat-topped instantaneous frequency profile.

Figure 5:
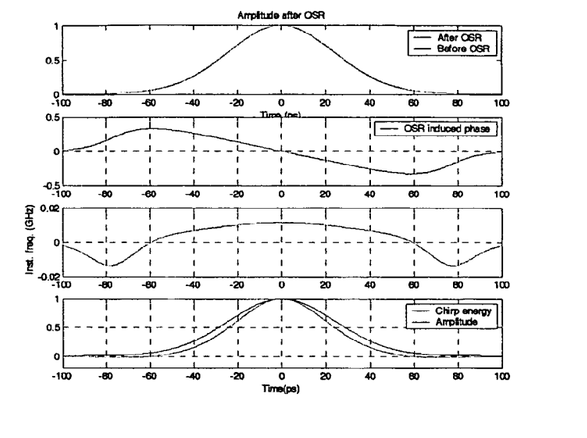
FIG. 5 is a schematic view illustrating the pulse shape and instantaneous frequency of an adiabatically chirped Gaussian pulse before and after a first order OSR; the Gaussian adiabatic chirp is substantially made into a flat-topped profile after the OSR.

FIG. 5 shows the input and output pulses for the example of a signal with adiabatic chirp at the OSR input. This case can be physically realized by directly modulating a DFB laser with the laser biased high above threshold, for example 80 mA. In this case the instantaneous frequency at the output of the laser follows the amplitude modulation according to:

$$\Delta\omega(t) = 2\pi\Delta f_{AD} P(t)/P_0, \quad (12)$$

where $\Delta f_{AD}$ is the adiabatic chirp magnitude, and $P(t) = A^2(t)$ is the optical power, and $P_0$ is its average. In this example, as shown in FIG. 5, the slope of the OSR is adjusted to obtain a nearly flat-topped frequency profile, while the envelope of the output pulse is nearly unaffected.

It is therefore an embodiment of the present invention to adjust the slope of the OSR to convert a signal having an adiabatic chirp frequency profile to one having a flat-topped chirp frequency profile.

The slope, b, of the OSR should be optimized to obtain a flat-topped instantaneous frequency profile from a given input pulse with adiabatic chirp. Consider the example of a Gaussian pulse with finite extinction ratio and with adiabatic chirp:

$$A(t) = a_1 \exp(-t^2/\tau^2) + a_0 \quad (13)$$

where $a_1$ is the amplitude and $a_0$ is constant background. The extinction ratio is finite and given by $ER = 10\log(a_1/a_0)$. Substituting Eq. 13 into Eq. 11 for the instantaneous frequency, and taking a linear approximation for the tangent function, the frequency correction induced by the OSR at the center of the pulse is $$\Delta\omega_{OSR}(t = 0) \sim \frac{2b}{\tau^2 a} \frac{1}{(1 + a_0/a_1)}. \quad (14)$$

The correction near the wings of the pulse $t = \tau$ is given by $$\Delta\omega_{OSR}(t = \tau) \sim \frac{2b}{\tau^2 a} \frac{(a_1/a_0 + 3e)}{(a_1/a_0 + e)}. \quad (15)$$

Assuming the pulse has an adiabatic chirp $\Delta f_{AD}$ before the OSR, the required frequency correction to obtain a flat top frequency profile is on the order of $\Delta\omega_{OSR} \sim 2\pi\Delta f_{AD}(1 - e^{-2})$. This is because the adiabatic chirp is $\sim \Delta f_{AD} e^{-2}$ near the wings of the Gaussian at $t \sim \tau$, and $\Delta f_{AD}$ at the peak of the Gaussian. Therefore, to obtain a flat-topped frequency profile, the difference between the frequency corrections, Eq. 14 and Eq. 15, at the center and the wing have to satisfy:

$$b \sim \pi \tau^2 a \Delta f_{AD} \frac{a_1}{a_0} h(a_0/a_1), \quad (16)$$

where $$h(x) = (1 - e^{-2}) \frac{(1+x)(1+ex)}{(1+2e+3ex)} \quad (10)$$

varies between $\sim 3(1-e^{-2})/7$ to $(1-e^{-2})/2$, as $a_1/a_0$ varies between 0 and 1, and has a small effect. Eq. 16 provides a prescription for adjusting the OSR slope and input signal characteristics in order to-generate flat-topped chirp. The required slope increases with increasing adiabatic chirp, input pulse width before the OSR, and input extinction ratio before the OSR. To reduce the required slope, for example, a shorter rise time and fall time, and a lower initial extinction ratio (ER) before the OSR, is needed. Note that an infinite ER, $a_0 \rightarrow 0$, at the input of the OSR produces no frequency flattening effect since it requires an infinite slope.

Figure 6:
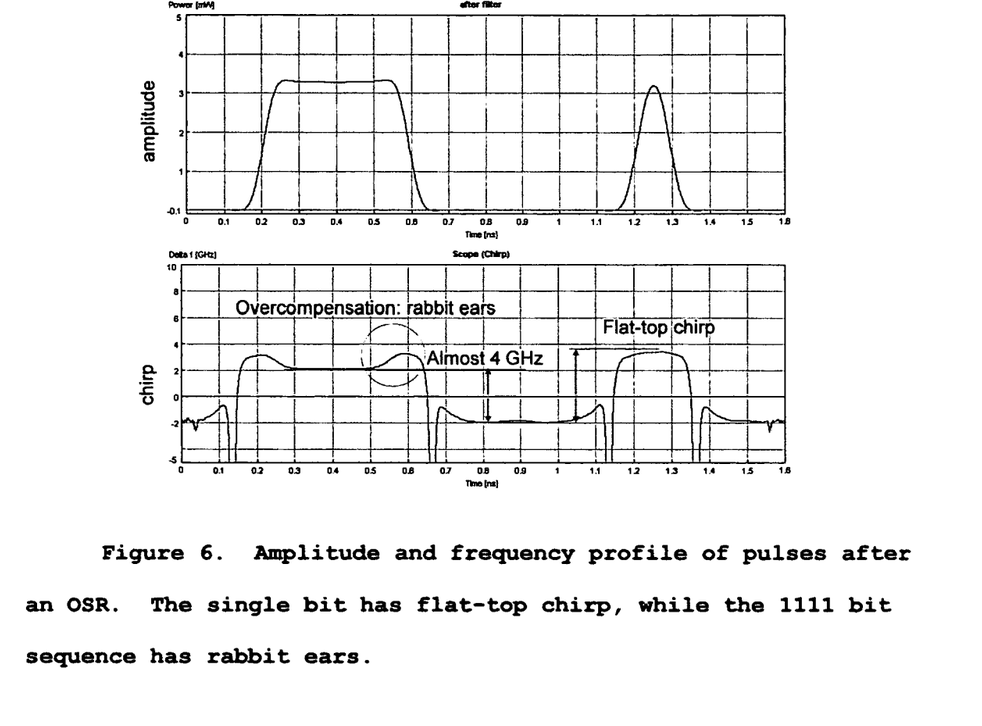
FIG. 6 is a schematic view illustrating the amplitude and frequency profiles of pulses after an OSR—the single bit has flat-topped chirp, while the 1111 bit sequence has rabbit ears.

If the OSR slope is increased further from the optimum for flat-top chirp, the frequency profile after the OSR will have a square shape with blue-shifted rabbit ears at both the rising and falling edges of the bit. FIG. 6 shows an example. It shows the amplitude and frequency profiles of a 1111 bit sequence and single 1 bit after passing through an OSR. The slope is such that the single bit has a flat-top frequency profile. However, the 1111 sequence has rabbit ears. This is because the 1111 bit sequence experiences a different effective slope for the particular OSR used. The OSR was the edge of a 3 cavity multi-etalon bandpass filter.

A variety of transmission or reflection filtering elements can be used as an OSR by tuning the wavelength of the input signal to the portion of the optical spectrum of the filter having the desired shape and slope. One example is the edge of the transmission curve having a high slope. Examples of filters that can function as OSRs are multicavity etalon filters, fiber Bragg gratings, a cascade of micro-ring resonators, single cavity Fabry-Perot filters, edge filters, and multicavity thin film filters.

In the above only a linear OSR has been considered. However, we have found by simulation and experiment that a variety of nonlinear OSR shapes generate a very similar effect. Examples are Bessel fitlers, edge fitlers having a tangent hyperbolic shape. Eq. 16 is a design guide for determining the optimum slope of the OSR for a given extinction ratio, adiabatic chirp, and rise/fall time.

In the examples and analysis above, only the transmission of the-OSR was taken into account. By the Kramers-Kronig relation, a frequency dependent transmission has an associated phase variation and a corresponding dispersion. As has been pointed out in prior U.S. Provisional Patent Application Ser. No. 60/416,102, filed Oct. 04, 2002 by Daniel Mahgerefteh et al. for FLAT DISPERSION FREQUENCY DISCRIMINATOR, and pending prior U.S. patent application Ser. No. 10/289,944, filed Nov. 06, 2002 by Daniel Mahgerefteh et al. for POWER SOURCE FOR A DISPERSION COMPENSATION FIBER OPTIC SYSTEM, which patent applications are hereby incorporated herein by reference, the dispersion of the filter can also be used to compensate for part of the dispersion in a transmission fiber. This compensation is manifested in the time domain by a linear instantaneous frequency profile near the peak of the 1 bit. A combination of the action of the OSR, at the edge of a filter, for example, and the negative dispersion of the filter, which gives the linear slope, can then convert an adiabatically frequency modulated signal before the OSR to an instantaneous frequency profile with a linear slope near the center of the pulse and fast rise and fall times at the transitions.

What is claimed is:

1. A fiber optic communication system comprising:
an optical signal source adapted to produce a binary amplitude modulated signal; and
an optical spectrum reshaper adapted to receive the amplitude modulated signal and to change the instantaneous frequency of the signal at its 0-to-1 and 1-to-0 transitions so as to change the instantaneous frequency of the signal so that it is substantially constant across the 1 pulse;
wherein the signal source is a directly modulated semiconductor laser; and
wherein the signal source is a tunable DBR laser.

2. A system according to claim 1 wherein the changes in the instantaneous frequency are in proportion to the absolute value of the first derivative of the temporal profile of the amplitude modulated signal.

3. A system according to claim 1 wherein the change in the instantaneous frequency from the 0-to-1 transition is the same as the change in the instantaneous frequency from the 1-to-0 transition.

4. A system according to claim 1 wherein the signal source is a fast tunable semiconductor laser.

5. A system according to claim 1 wherein the signal source is a directly modulated semiconductor laser.

6. A system according to claim 5 wherein the optical signal source is a distributed feedback laser.

7. A system according to claim 6 wherein the distributed feedback laser is biased high above its threshold current.

8. A system according to claim 1 wherein the optical spectrum reshaper is the transmission edge of a Bessel filter.

9. A system according to claim 1 wherein the optical spectrum reshaper is the transmission edge of a Mach-Zhender interferometer.

10. A system according to claim 1 wherein the optical spectrum reshaper is the transmission edge of an optical band pass filter.

11. A system according to claim 1 wherein the optical spectrum reshaper is an edge filter.

12. A system according to claim 1 wherein the optical spectrum reshaper is the transmission edge of a fiber Bragg grating filter.

13. A system according to claim 1 wherein the optical spectrum reshaper is the transmission edge of a multicavity etalon filter.

14. A system according to claim 1 wherein the optical spectrum reshaper is the transmission edge of a single cavity filter.

15. A system according to claim 1 wherein the optical spectrum reshaper is the transmission edge of a cascade of micro ring resonators.

16. A system according to claim 1 wherein the optical spectrum reshaper is the transmission edge of an arrayed waveguide grating.

17. A system according to claim 1 wherein the optical spectrum reshaper is the transmission edge of echelle grating.

18. A system according to claim 1 wherein the optical spectrum reshaper is adapted to change the instantaneous frequency of the signal so that it is substantially square-shaped, with rabbit ears at the 0-to-1 and 1-to-0 transitions.

19. A fiber optic communication system comprising:
an optical signal source adapted to produce a binary amplitude modulated signal having a first adiabatic instantaneous frequency profile; and
an optical spectrum reshaper adapted to receive the signal and change the first adiabatic instantaneous frequency profile to a second substantially flat-topped instantaneous frequency profile;
wherein the optical spectrum reshaper is characterized by a slope of its optical transmission versus optical frequency profile; and
wherein the slope of said OSR is selected according to the approximation $$b \sim \pi\tau^2 a \Delta f_{AD} \frac{a_1}{a_0} h(a_0/a_1).$$

20. A system according to claim 19 wherein the duration of the second substantially flat-topped instantaneous frequency profile is longer than the duration of the first adiabatic instantaneous frequency profile.

21. A system according to claim 19 wherein the first adiabatic instantaneous frequency profile is phase shifted relative to the binary signal amplitude profile.

22. A system according to claim 19 wherein the optical spectrum reshaper is adapted to change the first adiabatic instantaneous frequency profile to a second substantially square-shaped instantaneous frequency profile with rabbit ears at the leading and trailing edges of the pulse.

23. A system according to claim 19 wherein the rise and fall times of the second substantially flat-topped instantaneous frequency profile are shorter than the corresponding rise and fall times of the first adiabatic instantaneous frequency profile.

24. A system according to claim 19 wherein the duration of the second substantially flat-topped instantaneous frequency profile is shorter than the duration of the first adiabatic instantaneous frequency profile.

25. A fiber optic communication system comprising:
an optical signal source adapted to produce a binary amplitude modulated signal having a first adiabatic instantaneous frequency profile; and
an optical spectrum reshaper adapted to receive the signal and change the first adiabatic instantaneous frequency profile to a second substantially flat-topped instantaneous frequency profile;
wherein the optical spectrum reshaper is characterized by a slope of its optical transmission versus optical frequency profile; and
wherein said slope is between 2 dB/GHz and 4 dB/GHz, and the bit rate of the binary amplitude modulated signal is about 10 Gb/sec.

26. A system according to claim 19 wherein the slope of said OSR is a function of the rise time and fall time of the binary amplitude modulated signal.

27. A system according to claim 19 wherein the slope of said OSR is a function of the extinction ratio of the binary amplitude modulated signal.

28. A system according to claim 19 wherein the slope of said OSR is a function of the magnitude of the adiabatic chirp of the adiabatic instantaneous frequency profile.

29. A fiber optic communication system comprising:
an optical signal source adapted to receive a base signal and produce an amplitude modulated first signal having a first adiabatic instantaneous frequency profile; and
an OSR adapted to convert said first signal to a second signal, wherein said second signal has a substantially flat-topped instantaneous frequency profile;
wherein said base signal is a non-return-to-zero (NRZ) signal; and
wherein the product of the flat-topped instantaneous frequency excursion and 0 bit duration of the instantaneous frequency of said second signal is between an odd integer multiple of a fraction between 0.25 and 0.75.

30. A system according to claim 29 wherein said second signal further has a larger amplitude modulation than said first signal.

31. A system according to claim 29 wherein the second signal has an extinction ratio is between 10 dB and 15 dB.

32. A system according to claim 29 wherein said digital signal is a return-to-zero (RZ) signal.

33. A system according to claim 29 wherein the product of the flat-topped instantaneous frequency excursion and 0 bit duration of the instantaneous frequency of said second signal is substantially equal to an odd integer multiple of 0.5.

* * * * *